United States Patent [19]
Zhang et al.

[11] Patent Number: 6,145,302
[45] Date of Patent: Nov. 14, 2000

[54] METHOD FOR MONITORING A CATALYTIC CONVERTER

[75] Inventors: Hong Zhang; Johannes Beer, both of Regensburg, Germany

[73] Assignee: Siemens Aktiengesellschaft, Munich, Germany

[21] Appl. No.: 09/137,921

[22] Filed: Aug. 20, 1998

[30] Foreign Application Priority Data

Aug. 20, 1997 [DE] Germany .......................... 197 36 233

[51] Int. Cl.$^7$ ........................................ F01N 3/00
[52] U.S. Cl. .............. 60/274; 60/285; 60/277; 60/299; 703/7; 701/109; 73/118.1
[58] Field of Search .................. 60/277, 276, 274, 60/285, 299, 286; 701/109, 106; 395/500.29; 703/7, 8; 702/182, 183; 73/118.1

[56] References Cited

U.S. PATENT DOCUMENTS

| 5,419,122 | 5/1995 | Tabe et al. | 60/274 |
| 5,626,014 | 5/1997 | Hepburn et al. | 60/274 |
| 5,675,967 | 10/1997 | Ries-Mueller | 60/274 |
| 5,722,236 | 3/1998 | Cullen et al. | 60/274 |
| 5,732,551 | 3/1998 | Naber et al. | 60/274 |
| 5,802,843 | 9/1998 | Kurihara et al. | 60/274 |
| 5,894,724 | 4/1999 | Minowa et al. | 60/274 |
| 5,938,715 | 8/1999 | Zhang et al. | 701/109 |
| 5,998,210 | 5/1999 | Hepburn et al. | 634/37 |

FOREIGN PATENT DOCUMENTS

| 4201136A1 | 7/1993 | Germany . |
| 4211092A1 | 10/1993 | Germany . |
| 4308894A1 | 9/1994 | Germany . |
| 19527774A1 | 2/1996 | Germany . |

OTHER PUBLICATIONS

"Mathematik für Ingenieure des Maschinenbaus und der Elektrotechnik", Wolfgang Brauch et al., 7$^{th}$ edition, Teubner, Stuttgart 1985, pp. 660–668.

*Primary Examiner*—Thomas Denion
*Assistant Examiner*—Binh Tran
*Attorney, Agent, or Firm*—Herbert L. Lerner; Laurence A. Greenberg; Werner H. Stemer

[57] ABSTRACT

A method for monitoring a catalytic converter includes ascertaining a measured variable at the catalytic converter and comparing it with a comparison value. The comparison value is ascertained in accordance with a model that uses at least one parameter of a comparison catalytic converter. The parameter of the comparison catalytic converter is adapted on the basis of a measured variable of the catalytic converter to be monitored.

11 Claims, 3 Drawing Sheets

METHOD FOR MONITORING A CATALYTIC CONVERTER

BACKGROUND OF THE INVENTION

1. Field of the Invention

The invention relates to a method for monitoring a catalytic converter having a catalytic layer, in which a measured variable is ascertained at the catalytic converter and compared with a comparison value, and the comparison value is ascertained in accordance with a model that uses at least one parameter of the catalytic converter.

In German Published, Non-Prosecuted Patent Application DE 197 14 293 A1, corresponding to U.S. patent application Ser. No. 09/056,380, filed Apr. 7, 1998, a method for monitoring the conversion capability of a catalytic converter is described, in which an outlet temperature of the catalytic converter is ascertained as a measured variable, and the measured variable is compared with a comparison value. The comparison value is calculated in accordance with a model that is based on the outlet temperature of a non-catalytically-coated catalytic converter.

The model for calculating the comparison variable is dependent on the catalyst being used, on the motor vehicle operating conditions and on the site in which the catalytic converter is installed in the motor vehicle. That can affect the precision of the method.

A method and an apparatus for assessing the operability of a catalytic converter which are known from German Published, Non-Prosecuted Patent Application DE 42 11 092 A1, utilize a recognition that a conversion onset temperature of the catalytic converter becomes higher as the age of the catalytic converter becomes greater. A first method seeks to investigate when a catalytic converter begins to convert and to assess it as operational if the ascertained temperature is below a comparison temperature. A second method is disclosed in which the catalytic converter is operated under precisely predetermined operating conditions, and an investigation is directed as to how long it takes until the catalytic converter begins to convert. If the measured time period is shorter than a comparison time period, the catalytic converter is operational. A third method seeks to estimate the temperature of the catalytic converter using a model. As soon as the estimated temperature has attained a comparison temperature, an investigation is directed as to whether or not the catalytic converter has exceeded that temperature. If so, it is assessed as operational.

SUMMARY OF THE INVENTION

It is accordingly an object of the invention to provide a method for monitoring a catalytic converter, which overcomes the hereinafore-mentioned disadvantages of the heretofore-known methods of this general type and is more precise.

With the foregoing and other objects in view there is provided, in accordance with the invention, a method for monitoring a catalytic converter having a catalytic layer, which comprises ascertaining a measured variable at a catalytic converter to be monitored; adapting at least one parameter of the catalytic converter on the basis of the measured variable of the catalytic converter; ascertaining a comparison value in accordance with a model using the at least one parameter of the catalytic converter; and comparing the measured variable with the comparison value.

A substantial advantage of the invention results from the fact that the model, with which the comparison value is ascertained, is adapted to the catalytic converter to be monitored and/or to the conditions under which the catalytic converter to be monitored is used.

In accordance with another mode of the invention, there is provided a method which comprises ascertaining the parameter as a function of a thermal behavior of the catalytic converter.

In accordance with a further mode of the invention, there is provided a method which comprises ascertaining, with the model, a thermal behavior of a comparison catalytic converter having no catalytically active layer.

In accordance with an added mode of the invention, there is provided a method which comprises adapting a heat transfer coefficient of the comparison catalytic converter to the ambient air, to a heat transfer coefficient of the catalytic converter to the ambient air, as the parameter.

In accordance with an additional mode of the invention, there is provided a method which comprises adapting a heat transfer coefficient between exhaust gas and the comparison catalytic converter, to a heat transfer coefficient between the exhaust gas and the catalytic converter, as the parameter.

In accordance with yet another mode of the invention, there is provided a method which comprises ascertaining the measured variable in a predetermined temperature range in which a thermal behavior of the catalytic converter is unaffected by, or only insignificantly affected by, an exothermic reaction of the catalytic converter.

In accordance with yet a further mode of the invention, there is provided a method which comprises ascertaining the parameter prior to monitoring the catalytic converter, in particular after starting the engine.

In accordance with yet an added mode of the invention, there is provided a method which comprises adapting the parameter in an enrichment phase of the engine.

In accordance with a concomitant mode of the invention, there is provided a method which comprises adapting the parameter during an overrunning cutoff phase of the engine.

Other features which are considered as characteristic for the invention are set forth in the appended claims.

Although the invention is illustrated and described herein as embodied in a method for monitoring a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
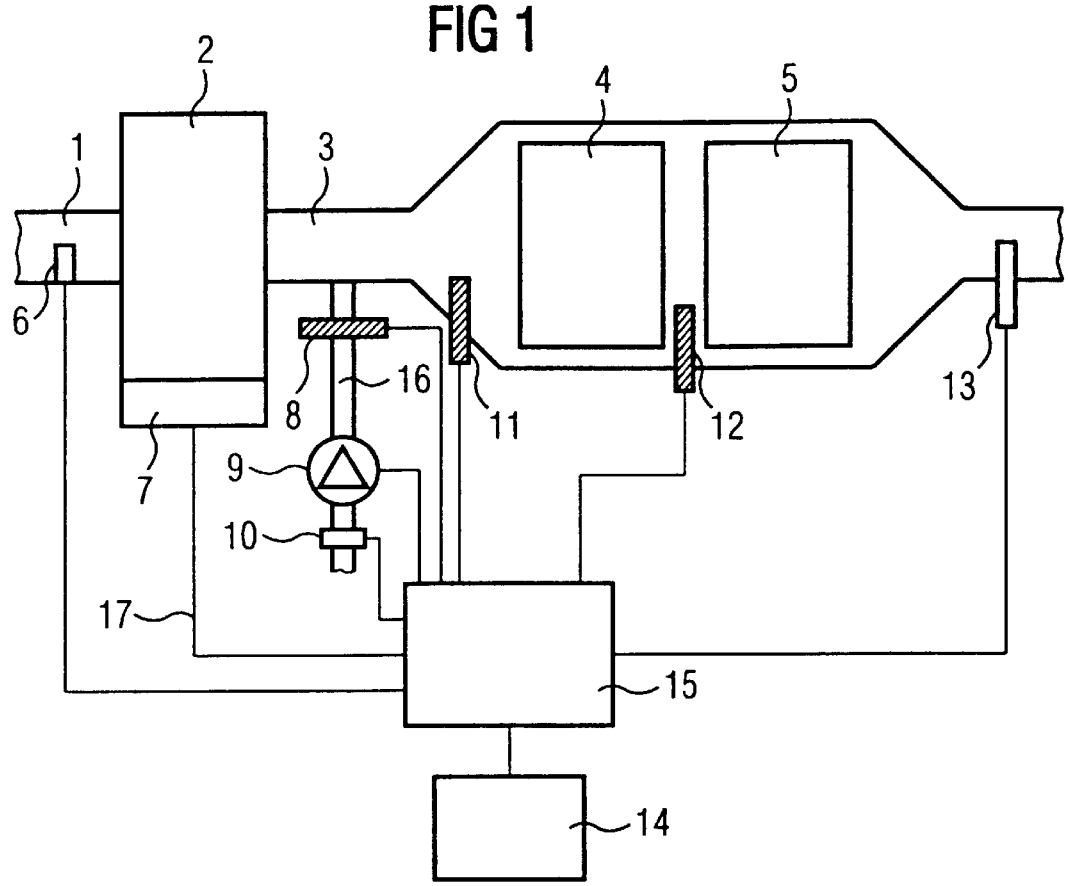
FIG. 1 is a diagrammatic and schematic view of a layout of an exhaust gas cleaning system.

Referring now to the figures of the drawings in detail and first, particularly, to FIG. 1 thereof, there is seen an internal combustion engine 2 with an injection system 7, which is connected to an intake system 1 and an exhaust gas system 3. A precatalytic converter 4 and a main catalytic converter 5, which is separate from and downstream of the precatalytic converter 4 in a flow direction, are provided in the exhaust gas system 3. A first temperature sensor 11 is installed upstream of the precatalytic converter 4, and a second temperature sensor 12 is installed between the precatalytic converter 4 and the main catalytic converter 5, in the exhaust gas system 3. A lambda sensor 13 is disposed downstream of the main catalytic converter 5 in the exhaust gas system 3.

A secondary air supply line 16 discharges into the exhaust gas system 3 between the engine 2 and the precatalytic converter 4. A valve 8, a secondary air pump 9 and a second air flow rate meter 10, are disposed in the secondary air supply line 16.

A first air flow rate meter 6 which is installed in the intake system 1, communicates over a signal line with a control unit 15 that has a data memory 14. The control unit 15 communicates over a data bus 17 with the engine 2 and the injection system 7. In addition, the control unit 15 is connected over signal lines to the second air flow rate meter 10, the first temperature sensor 11, the second temperature sensor 12 and the lambda sensor 13. The secondary air pump 9 and the valve 8 are connected to the control unit 15 through trigger lines.

The control unit 15 controls injection to the engine 2 and delivery of secondary air to the exhaust gas system 3, as a function of a supplied engine air flow rate and an exhaust gas composition downstream of the main catalytic converter 5.

The control unit 15 measures an inlet temperature upstream and an outlet temperature downstream of the precatalytic converter 4. Next, the inlet temperature and a temperature model are used by the control unit 15 to calculate a second outlet temperature, which would prevail downstream of a crude emissions catalytic converter through which the same exhaust gas mass flow with the same inlet temperature as in the precatalytic converter 4, would flow. The crude emissions catalytic converter is constructed similarly to the precatalytic converter 4 but has no catalytic layer and thus does not catalytically generate any exothermic thermal energy.

The control unit 15 then calculates the thermal energy exothermically generated in the precatalytic converter 4, from the first and the second outlet temperatures. The exothermic thermal energy is a measure of the quality of the conversion capability of the precatalytic converter 4.

Figure 2:
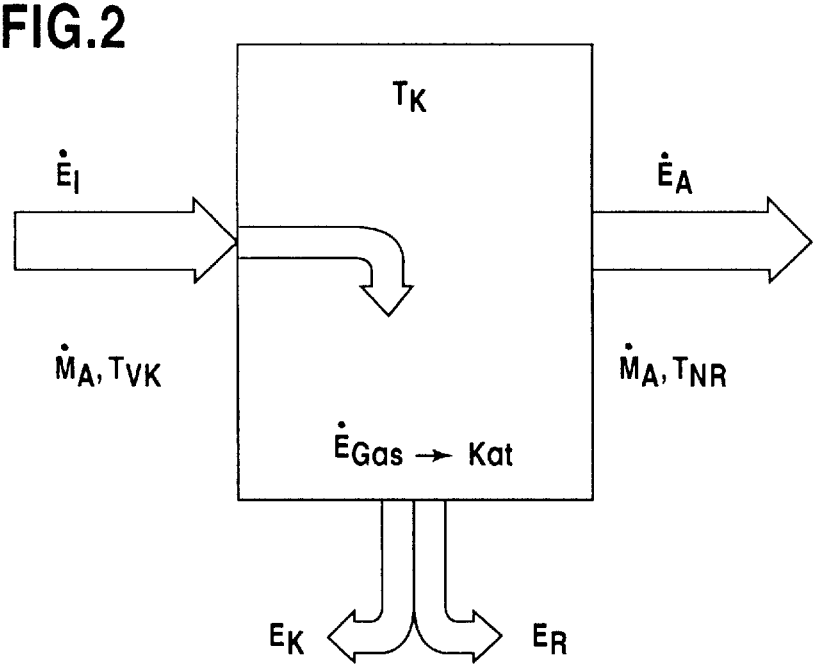
FIG. 2 is a theoretical model for calculating an outlet temperature of a comparison catalytic converter.

FIG. 2 schematically shows a model with which the outlet temperature of the crude emissions catalytic converter is calculated. An energy balance of a catalytic converter is the result of a thermal output $E_1$, which is supplied to the catalytic converter through an exhaust gas mass flow $M_A$ that has an inlet temperature $T_{VK}$. An energy transfer from the exhaust gas to the catalytic converter takes place in the catalytic converter. In the process, the catalytic converter heats up to a catalytic converter temperature $T_K$. This is symbolically represented in FIG. 2 as an output transfer $\dot{E}_{Gas\_Kat}$. In addition, the catalytic converter gives up a convection output $\dot{E}_K$ and a radiant flux $\dot{E}_R$ to the ambient air. At the same time, an energy output $\dot{E}_A$ is carried away from the catalytic converter along with the exhaust gas.

In accordance with this temperature model, an outlet temperature of the exhaust gas $T_{NR}$ that remains downstream of the crude emissions catalytic converter is calculated. The crude emissions catalytic converter is equivalent in structure to the precatalytic converter 4 but in contrast to the precatalytic converter 4, it has no catalytic coating.

The outlet temperature $T_{NR}$ of the exhaust gas flow downstream of the crude emissions catalytic converter is calculated from the inlet temperature $T_{VK}$ and the exhaust gas mass flow $\dot{M}_A$ based on an energy balance equation of the uncoated crude emissions catalytic converter. The inlet temperature $T_{VK}$ is measured with the first temperature sensor 11 upstream of the precatalytic converter 4. The exhaust gas mass flow $\dot{M}_A$ is determined from the aspirated engine air and from the secondary air being supplied, which are measured by the first air flow rate meter 6 and the second air flow rate meter 10, respectively.

The thermal output or energy flow $\dot{E}_1$ supplied to the precatalytic converter 4, is calculated by equation 1 as follows:

$$\dot{E}_1 = \dot{M}_A \cdot T_{VK} \cdot c_A,$$

in which $\dot{M}_A$ designates the exhaust gas mass flow, $T_{VK}$ designates the measured inlet temperature of the exhaust gas upstream of the precatalytic converter 4, and $c_A$ designates a specific thermal capacity of the exhaust gas at constant pressure.

The exhaust gas mass flow $\dot{M}_A$ is calculated in accordance with equation 2 using the following formula:

$$\dot{M}_A = (1+1/C_S) \cdot \dot{M}_{LM} + \dot{M}_{SLM},$$

in which $\dot{M}_{SLM}$ designates the secondary air mass flow, $\dot{M}_{LM}$ designates the engine air mass flow, and $C_S$ designates a coefficient for the supplied fuel quantity, which has a value of 14.3 when $\lambda=1$.

The output transfer $\dot{E}_{Ab}$ of the exhaust gas to a catalytic converter monolith is described by equation 3:

$$\dot{E}_{Ab} = \dot{M}_A \cdot k_1 \cdot A_M (T_{VK} - T_k)$$

where $k_1$ designates a thermal transfer coefficient from the exhaust gas to the catalytic converter monolith, $A_M$ designates a surface area of the catalytic converter monolith bathed by the exhaust gas, and $T_K$ designates the temperature of the catalytic converter monolith.

In accordance with Boltzmann's radiation principle, the heat flow $\dot{E}_R$ radiated by a crude emissions catalytic converter is obtained in accordance with equation 4:

$$\dot{E}_R = A_o \cdot k_B \cdot (T_k^4 - T_U^4)$$

in which $A_o$ designates an external surface area of the catalytic converter, $k_B$ is Boltzmann's constant, $T_U$ is the ambient temperature, and $T_K$ is the catalytic converter temperature.

The crude emissions catalytic converter emits a convection flow by convection that is described by equation 5:

$$\dot{E}_K = A_o k_2(V) \cdot (T_K - T_U)$$

where $\dot{E}_K$ stands for a convection output, $A_o$ stands for the external surface area of the catalytic converter, and a constant $k_2(v)$ stands for a heat transfer coefficient from the catalytic converter surface to the ambient air as a function of the vehicle speed v. The constant $k_2$ is applied as a function of the vehicle speed.

A first order differential equation for the temperature $T_K$ of the crude emissions catalytic converter is obtained from the output balance equation in accordance with equation 6:

$$\dot{T}_K = \frac{1}{m_K \cdot c_K}(\dot{E}_{Ab} - \dot{E}_R - \dot{E}_K)$$

in which $m_K$ designates a mass of the crude emissions catalytic converter monolith and $c_K$ designates a specific thermal capacity of the crude emissions catalytic converter monolith.

Finally, the outlet temperature $T_{NR}$ downstream of the crude emissions catalytic converter is calculated from equation 6 and equation 3 in accordance with equation 7:

$$T_{NR} = \frac{\dot{E}_1 - \dot{E}_{Ab}}{c_A \cdot \dot{M}_A}.$$

Temperature courses of the crude emissions catalytic converter are measured on an engine test bench and used to adapt the model parameters $k_1$, $k_2$, $k_b$ and $c_K$ accordingly. This is done in order to provide an optimal temperature model for calculating the second outlet temperature $T_{NR}$ downstream of the crude emissions catalytic converter. Therefore, the incident error between the temperature model and the actual heating up of the crude emissions catalytic converter is minimized.

The calculated second outlet temperature $T_{NR}$ downstream of the crude emissions catalytic converter and the first outlet temperature $T_{NK}$ downstream of the precatalytic converter 4, measured with the second temperature sensor 12, are used to calculate an exothermic output $\dot{E}_E$ generated in the precatalytic converter in accordance with equation 8 as follows:

$$\dot{E}_E(t) = (T_{NK} - T_{NR}) \cdot \dot{M}_A \cdot c_A$$

in which $c_A$ designates the specific thermal capacity of the exhaust gas.

The exothermic output $\dot{E}_E$ is a measure for the conversion capability of the precatalytic converter, since the exothermic output becomes greater as the precatalytic converter becomes more catalytically active.

A simple comparison for assessing the conversion capability of the precatalytic converter 4 is based on comparing the first and second outlet temperatures and, for instance, from a difference $(T_{NK} - T_{NR})$ between the outlet temperatures determining the conversion capability of the precatalytic converter 4. As a comparison, an outlet temperature of a reference catalytic converter that is still just barely functioning correctly under the same conditions, can also be used.

Figure 3:
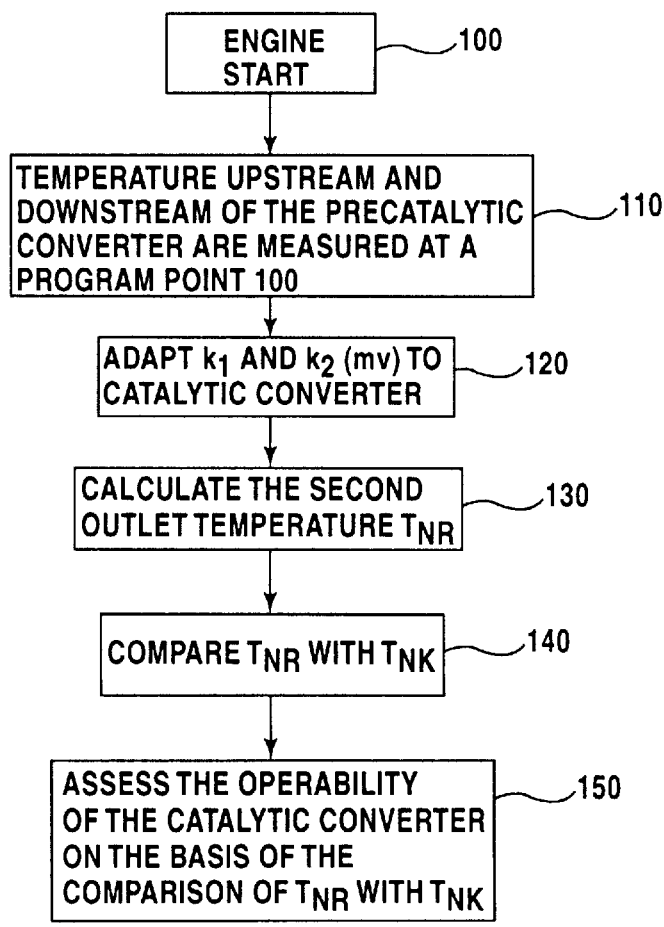
FIG. 3 is a flow chart for performing the method.

FIG. 3 illustrates a schematic program sequence for performing the method of the invention. The engine 2 is started at a program point 100. Next, the temperature upstream of the precatalytic converter 4 and the temperature downstream of the precatalytic converter 4 are measured at a program point 110.

The heat transfer coefficient $k_1$ from the exhaust gas to the catalytic converter monolith and the heat transfer coefficient $k_2(v)$ from the catalytic converter surface to the ambient air are adapted individually to the specific catalytic converter to be monitored, at program point 120. The parameter adaptation is performed at a light-off temperature, because in this temperature range in the precatalytic converter 4, no exothermic reaction occurs and therefore the precatalytic converter 4 exhibits a thermal behavior that serves as a reference for the crude emissions catalytic converter.

To that end, the heat transfer coefficients $k_1$, $k_2(v)$ are optimized, for instance iteratively, in such a way that the model by which the temperature of the crude emissions catalytic converter is calculated corresponds precisely to the course over time of the measured first outlet temperature $T_{NK}$ downstream of the precatalytic converter 4.

A further preferred method for optimizing the two heat transfer coefficients $k_1$, $k_2(v)$ is to determine the heat transfer coefficients $k_1$, $k_2(v)$ through a calibration calculation. This is done in such a way that the sum of the squares of the apparent errors by which the development over time of the calculated second outlet temperature $T_{NK}$ downstream of the crude emissions catalytic converter deviates from the development over time of the measured second outlet temperature $T_{NK}$ downstream of the precatalytic converter 4 becomes a minimum. This method is described, for instance, in a book entitled "Mathematik für Ingenieure" [Mathematics for Engineers], Brauch et al, B. G. Tenbner, Stuttgart, 1985.

However, depending on the application, one skilled in the art will also employ other methods for individual adaptation of the heat transfer coefficients $k_1$ and $k_2(v)$.

The control unit 15, with the individually adapted heat transfer coefficients $k_1$, $k_2(v)$ according to equation 7, calculates the second outlet temperature $T_{NR}$ of the crude emissions catalytic converter, at a program point 130.

Figure 4:
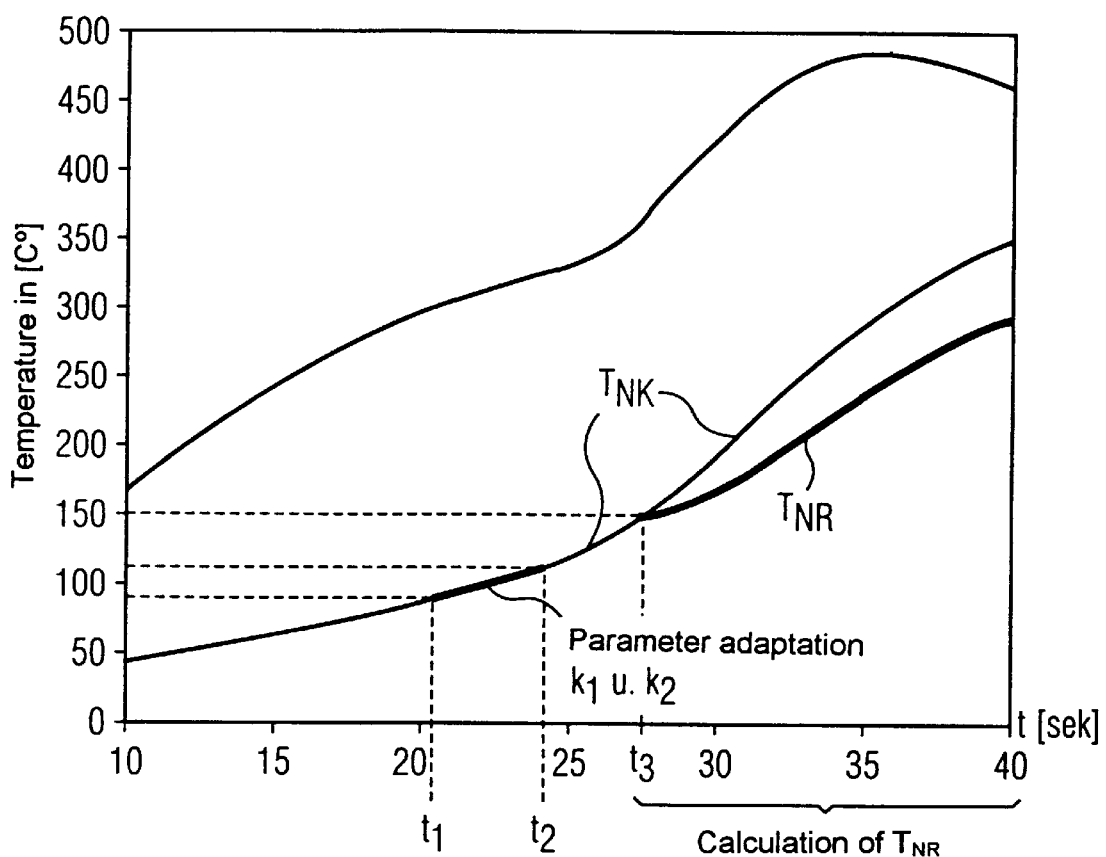
FIG. 4 is a graph of temperature courses as a function of time.

The outlet temperature $T_{NR}$ of the crude emissions catalytic converter is plotted as a function of time in FIG. 4.

The control unit 15 compares the calculated second outlet temperature $T_{NR}$ of the crude emissions catalytic converter with the measured first outlet temperature $T_{NK}$ of the precatalytic converter 4, at a program point 140.

Next, the control unit 15 assesses the operability of the catalytic converter 4, at a program point 150, on the basis of the comparison of the measured first outlet temperature $T_{NK}$ downstream of the catalytic converter 4 and the calculated second outlet temperature $T_{NR}$ of the crude emissions catalytic converter.

A more-accurate assessment of the conversion capability of the precatalytic converter is attained by calculating the exothermic output $E_E$, which is described in equation 8. The precatalytic converter 4 is assessed on the basis of the differences between the exothermic output of the precatalytic converter 4 and comparison values for the exothermic output of comparison catalytic converters.

FIG. 4 also shows the course over time of the outlet temperature $T_{NK}$ which is measured downstream of the precatalytic converter 4. Moreover, the outlet temperature $T_{NR}$ which is calculated in accordance with the model for the crude emissions catalytic converter is shown beyond a light-off temperature of 150° C. and a light-off time $t_3$. It is clear from the comparison of the first outlet temperature $T_{NK}$ with the second outlet temperature $T_{NR}$, that beyond the temperature of 150° C., the first outlet temperature downstream of the precatalytic converter 4 is higher than the calculated second outlet temperature.

The reason that this is true is that the catalytically coated precatalytic converter 4 lights off and begins a conversion of the pollutants, which is an exothermic reaction.

FIG. 4 shows that, in a temperature range between 90° C. and 110° C., which corresponds to a time slot between 21 seconds and 24 seconds after the start, the first outlet temperature $T_{NK}$ of the precatalytic converter 4 is particularly wide. In this selected temperature range, or this selected time range, the parameter adaptation of the heat coefficients $k_2(v)$ and $k_1$ illustrated in FIG. 4 for the program point 130 is performed.

In principle, it is advantageous to perform the parameter adaptation in a temperature range below the lighting off temperature, preferably below 150° C. The preferred temperature range is between 20° C. and 120° C. Especially good results are obtained in a temperature range from 80° C. to 120° C. The temperatures indicated are referred to the first outlet temperature $T_{NK}$.

According to a preferred refinement of the invention, the parameter adaptation is performed in an enrichment phase or as an overrunning cutoff phase, because in these operating states no exothermic conversion of energy takes place in the precatalytic converter 4.

In principle, the adaptation of the parameters becomes better, as the adaptation is more precisely performed, or in other words as the temperature range within which the parameter adaptation takes place becomes wider. However, the temperature must be below the light-off temperature at which an exothermic reaction ensues.

A refinement of the invention is based on the fact that the exhaust gas temperature upstream of the precatalytic converter 4 is calculated through an independent temperature model as a function of the rpm, the supplied fuel mass, the ignition angle, and the lambda value. The calculated exhaust gas temperature is used as an inlet temperature upstream of the precatalytic converter 4 in order to calculate the second outlet temperature $T_{NR}$. In this case as well, a parameter adaptation is performed as described.

The essential concept of the invention, in monitoring a catalytic converter, is to detect a measured value of the catalytic converter and to compare it with a comparison value that is calculated in accordance with a model. The model is at least partially adapted to given conditions, using a measured value for the catalytic converter to be monitored. The advantage resides in particular in the fact that an individual parameter adaptation is performed, in which the various operating conditions and/or catalytic converter conditions are taken into account. Preferably, the individual parameter adaptation is performed before each instance of monitoring the catalytic converter. Essential parameters are the heat transfer coefficients $k_1$ and $k_2(v)$ where $k_1$ describes the heat transfer between the exhaust gas and the catalytic converter and $k_2(v)$ describes the heat transfer between the catalytic converter housing and the ambient air.

The basic concept is to adapt parameters of the precatalytic converter 4 that describe the thermal behavior of the precatalytic converter 4, so that a more-precise model for calculating a comparison value is attained.

One skilled in the art will apply this method analogously to other parameters and/or other processes as well.

We claim:

1. A method for monitoring a catalytic converter having a catalytic layer, which comprises:

ascertaining a measured variable at a catalytic converter to be monitored;

ascertaining a comparison value in using a model, the comparison value depending on at least one parameter of the catalytic converter;

comparing the measured variable with the comparison value; and adjusting the at least one parameter of the model of the catalytic converter on the basis of the measured variable of the catalytic converter.

2. The method according to claim 1, which comprises ascertaining the parameter as a function of a thermal behavior of the catalytic converter.

3. The method according to claim 1, which comprises ascertaining, with the model, a thermal behavior of a comparison catalytic converter having no catalytically active layer.

4. The method according to claim 3, which comprises adapting a heat transfer coefficient of the comparison catalytic converter to the ambient air, to a heat transfer coefficient of the catalytic converter to the ambient air, as the parameter.

5. The method according to claim 3, which comprises adapting a heat transfer coefficient between exhaust gas and the comparison catalytic converter, to a heat transfer coefficient between the exhaust gas and the catalytic converter, as the parameter.

6. The method according to claim 3, which comprises adapting the parameter in an enrichment phase of an engine upstream of the catalytic converter.

7. The method according to claim 3, which comprises adapting the parameter during an overrunning cutoff phase of an engine upstream of the catalytic converter.

8. The method according to claim 1, which comprises ascertaining the measured variable in a predetermined temperature range in which a thermal behavior of the catalytic converter is unaffected by an exothermic reaction of the catalytic converter.

9. The method according to claim 1, which comprises ascertaining the measured variable in a predetermined temperature range in which a thermal behavior of the catalytic converter is insignificantly affected by an exothermic reaction of the catalytic converter.

10. The method according to claim 1, which comprises ascertaining the parameter prior to monitoring the catalytic converter.

11. The method according to claim 10, which comprises ascertaining the parameter after starting an engine upstream of the catalytic converter.

* * * * *